(12) United States Patent
Larson

(10) Patent No.: US 6,948,410 B1
(45) Date of Patent: Sep. 27, 2005

(54) TORQUE WRENCH WITH SLEEVE FOR LOCKING ROTATABLE HANDLE

(75) Inventor: John Andrew Larson, Chicago, IL (US)

(73) Assignee: Precision Instruments, Inc., Des Plaines, IL (US)

( * ) Notice: Subject to any disclaimer, the term of this patent is extended or adjusted under 35 U.S.C. 154(b) by 29 days.

(21) Appl. No.: 10/794,103

(22) Filed: Mar. 4, 2004

(51) Int. Cl.$^7$ .......................... B25B 23/14; F16B 21/00
(52) U.S. Cl. ................. 81/467; 81/478; 81/479; 81/480; 81/481; 81/473; 81/474; 81/475; 81/476; 73/862.21; 73/862.22; 73/862.23; 73/191; 73/847; 173/176; 403/DIG. 6; 403/322.2
(58) Field of Search ...................... 81/467, 478–481, 81/473–476; 73/862.21, 862.22, 862.23, 73/862.191, 847; 173/176; 403/DIG. 6, 321, 403/322.1, 322.2

(56) References Cited

U.S. PATENT DOCUMENTS

| | | | | |
|---|---|---|---|---|
| 2,918,834 A | * | 12/1959 | Cranford | 81/481 |
| 3,016,773 A | * | 1/1962 | Woods | 81/483 |
| 3,165,014 A | * | 1/1965 | Grabovac | 81/483 |
| 3,270,594 A | * | 9/1966 | Grabovac | 81/483 |
| 3,581,606 A | * | 6/1971 | Grabovac | 81/483 |
| 4,655,104 A | * | 4/1987 | Blattner | 81/483 |
| 4,901,610 A | * | 2/1990 | Larson et al. | 81/473 |
| 5,129,293 A | * | 7/1992 | Larson et al. | 81/483 |
| 5,503,042 A | | 4/1996 | Larson et al. | |
| 5,546,816 A | * | 8/1996 | Jansson et al. | 73/862.21 |
| 5,662,012 A | * | 9/1997 | Grabovac | 81/483 |
| 6,463,834 B2 | * | 10/2002 | Kemp et al. | 81/483 |

* cited by examiner

Primary Examiner—Joseph J. Hail, III
Assistant Examiner—Bryan Muller
(74) Attorney, Agent, or Firm—Gardner Carton & Douglas LLP

(57) ABSTRACT

A torque wrench is provided having body and a handle that is rotatably mounted to the body for adjusting the torque setting, and an axially movable sleeve operable to selectively lock the handle. The sleeve includes a rigid member and an elastomeric member, such as an O-ring, and the sleeve is configured to act against a locking ball held in a bore of the handle. The sleeve is selectively movable between two positions: (a) a locked position wherein the rigid member firmly retains the locking ball seated in one of several detents in the body, thereby preventing rotation of the handle; and (b) an unlocked position wherein the elastomeric member biases the locking ball inwardly, deflecting when the locking ball unseats from the detent to permit handle rotation. When the sleeve is in the unlocked position, the locking ball can incrementally "click" over the detents during handle rotation.

24 Claims, 4 Drawing Sheets

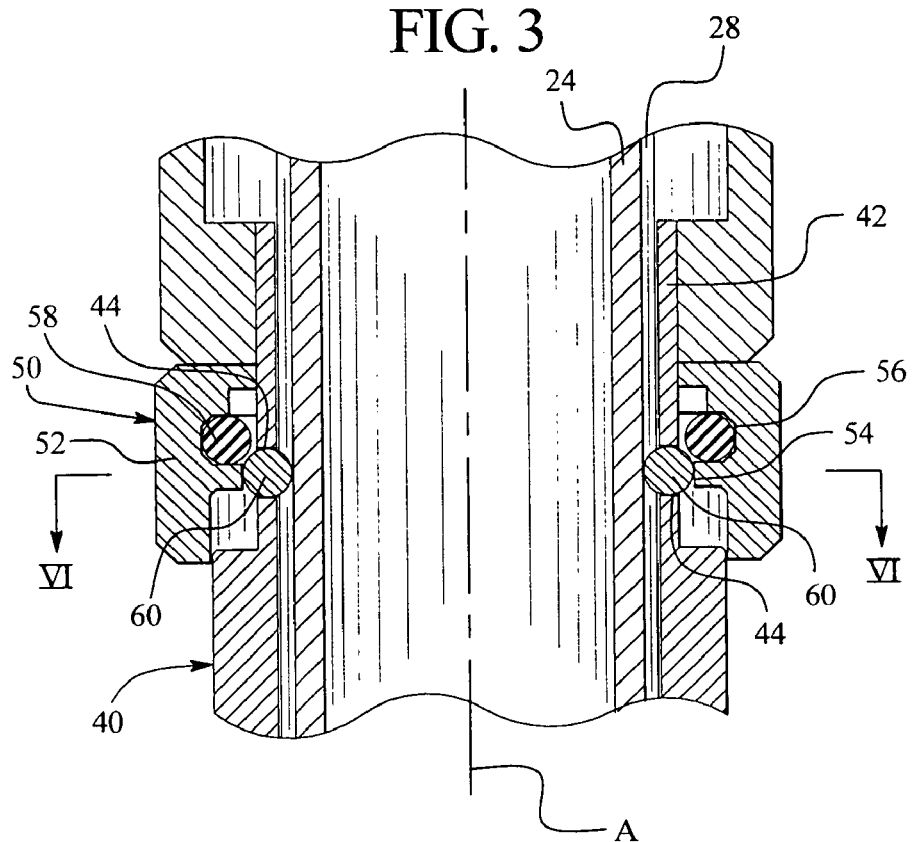
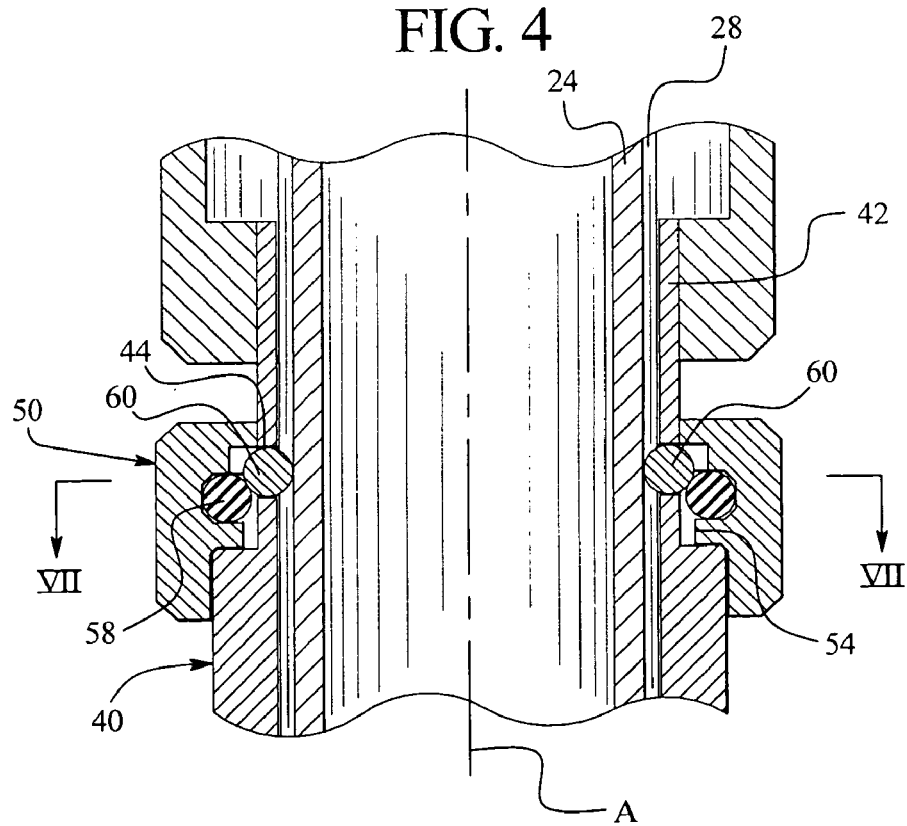

TORQUE WRENCH WITH SLEEVE FOR LOCKING ROTATABLE HANDLE

FIELD OF THE INVENTION

This invention generally pertains to torque wrenches and more particularly to torque wrenches having a rotatable handle for adjusting a torque setting.

BACKGROUND OF THE INVENTION

Adjustable torque wrenches are generally known. One common style of torque wrench has a rotatable handle that is operable to adjust a torque setting. Some conventional handles can have a slidable locking sleeve including an interior coil spring biasing the sleeve toward the locked position. Another conventional locking sleeve is rotatable and includes an interior cam surface acting on a leaf spring. Problems exist with conventional locking mechanisms in known rotatably adjustable handles mounted to these hand tools. For example, conventional handle locking mechanisms have required complicated machining steps during manufacture, and the parts such as the leaf spring can fatigue and fail.

Thus, an improved locking sleeve is needed.

BRIEF SUMMARY OF THE INVENTION

The present invention overcomes deficiencies in the prior art and provides an improved torque wrench. For example, in an embodiment, a tool is provided, such as a torque wrench, including a generally tubular body that extends generally along an axis, a handle rotatably mounted to the body, and a locking sleeve mounted to the handle for slidable movement along a direction parallel to the axis relative to the handle. The exterior surface of the tubular body includes at least one detent, such as a groove, recess, or flute, extending along a direction parallel to the axis. The handle includes at least one radial bore, and at least one locking ball positioned in the bore. The locking sleeve includes a rigid member and an elastomeric member, and moves along the direction parallel to the axis between a locked position, wherein the locking sleeve holds the locking ball seated in the detent, and an unlocked position, wherein the locking sleeve permits the locking ball to unseat from the detent when the handle is rotated.

In the locked position, the rigid member, having an interior first surface such as a concentric interior first surface, an annular wall, and the like, is positioned to retain the locking ball radially inwardly to seat in the at least one detent of the body so that the handle is prevented from rotating. In the unlocked position, the interior first surface of the rigid member is positioned generally free from the locking ball so that the locking ball contacts the elastomeric member, the elastomeric member biasing the locking ball radially inwardly and being deflectable to permit radial movement of the locking ball to unseat from the at least one detent when the handle is rotated relative to the body.

In an embodiment, the torque wrench includes an adjustable signaling mechanism, such as a torque signaling mechanism housed within the body. The torque wrench includes a rotatable handle mounted to the body, the handle being operably linked to a torque signaling mechanism so that rotation of the handle results in adjustment of the predetermined torque setting.

In an embodiment, the locking sleeve includes a rigid member having an interior second surface such as an annular recess, an annular groove, and the like. In a related embodiment, the elastomeric member is seated adjacent the annular recess.

In an embodiment, the elastomeric member is an O-ring.

In an embodiment, the body of the tool has at least two detents positioned along a direction parallel to the axis, and the handle has at least two radial bores and at least two locking balls, one locking ball positioned in each bore. The two radial bores are spaced preferably about 180° apart on the handle.

An advantage of the present invention is that it provides a torque wrench having an improved locking mechanism in the handle. The improved locking mechanism avoids a need for complicated machining steps during manufacture, and reduces parts that can fail.

In an embodiment, another advantage of the present invention is that the locking sleeve includes an elastomeric member, such as an O-ring, which avoids a need for a metal spring.

Yet another advantage of the present invention is that it provides a locking sleeve that can be retained indefinitely in the unlocked position. In an embodiment, the locking sleeve advantageously "clicks" into the unlocked position in which it is held by a slight bias. A related advantage is that in the unlocked position, the handle can be easily rotated to incrementally adjust the torque setting.

In an embodiment, a further advantage of the present invention is that it provides a locking ball that can seat in at least one detent or recess while allowing for facile locking and unlocking by slidably moving the locking sleeve that can be biased toward the unlocked position. A related advantage is that when the locking sleeve is in the unlocked position, the locking ball can incrementally "click" over the detents during handle rotation.

BRIEF DESCRIPTION OF THE DRAWINGS

FIG. 3 is a sectional view taken generally along line III—III of FIG. 6, illustrating the locking sleeve in a locked position, in which the locking balls are retained in the detents by the locking sleeve.

FIG. 4 is a sectional view taken generally along line IV—IV of FIG. 7, illustrating the locking sleeve in an unlocked position, in which the locking balls are free from the annular wall.

DETAILED DESCRIPTION OF THE INVENTION

While the invention will be described in connection with the preferred embodiment, it will be understood that there is no intent to limit the scope of the invention to this embodiment. On the contrary, it is intended that the claims will cover all alternatives, modifications and equivalents as may be included within the spirit and scope of the invention.

Torque wrenches have been developed to attach fasteners of many types to meet varying specifications. Such hand tools can include micrometer adjustable click wrenches and the like, such as that described in U.S. Pat. No. 5,503,042 to Larson et al., herein incorporated by reference in its entirety. The structure for useful torque wrenches is generally disclosed in U.S. Pat. No. 5,503,042, and in the present invention is embodied in an improved locking mechanism in a rotatable handle.

Figure 1:
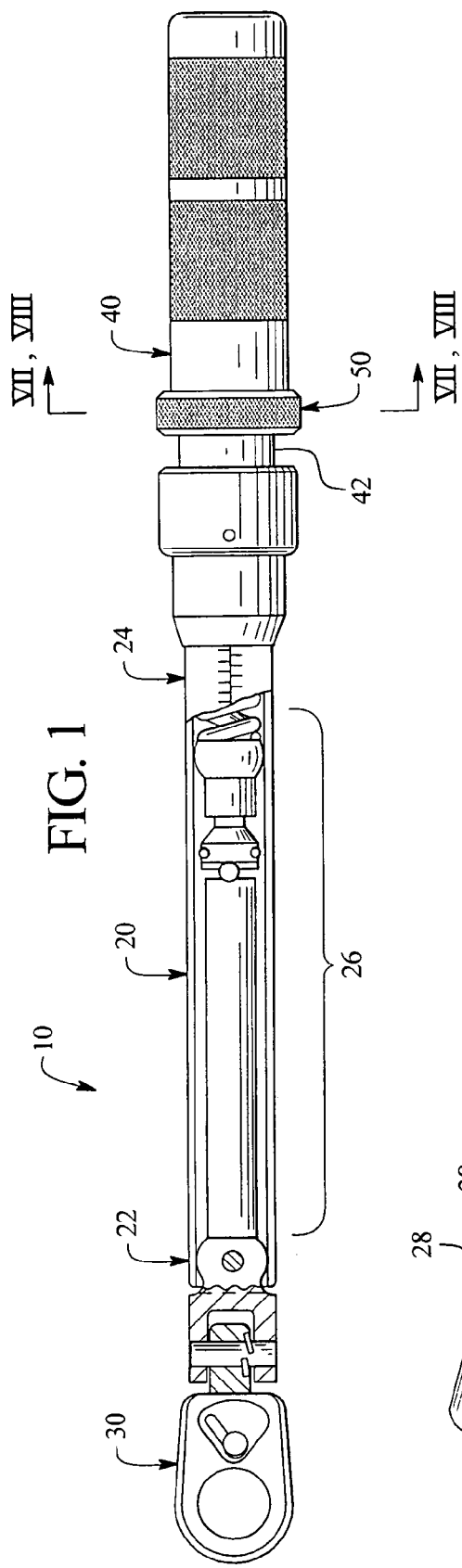
FIG. 1 is an elevational view of a torque wrench having features according to teachings of the present invention, the torque wrench having a body shown partially broken away to reveal internal wrench components.
Figure 2:
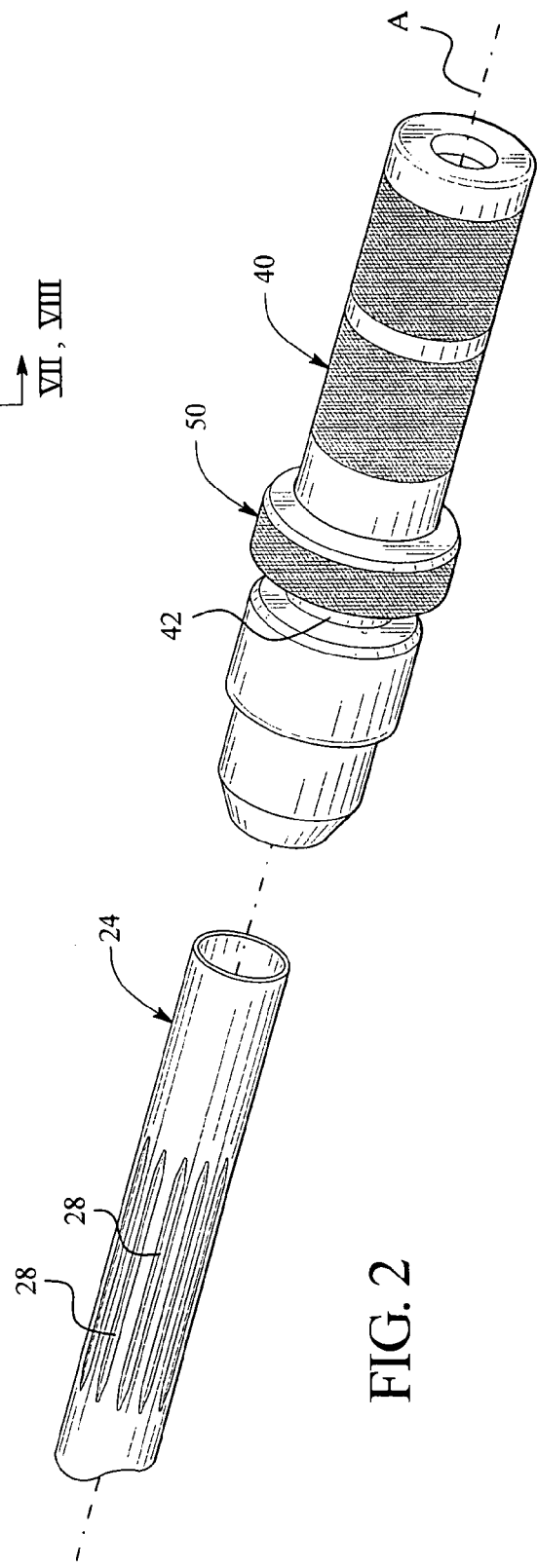
FIG. 2 is a fragmentary, exploded perspective view of a handle of the torque wrench of FIG. 1, and a portion of the tubular body of the torque wrench having detents along an exterior surface.

Now referring to the drawings, wherein like numerals designate like components, FIG. 1 illustrates a torque wrench 10 which generally includes an elongate, tubular body 20 that extends generally along an axis A. The body 20 of the torque wrench 10 has a proximal end 24 opposite a distal end 22. The proximal end 24 includes in its exterior surface at least one detent, such as a flute 28 (as shown in FIG. 2) positioned along a direction parallel to the axis A. The detent can be a groove, recess, or the like, extending along a direction parallel to the axis A. The proximal end 24 of the body 20 can have multiple flutes 28. For example, the proximal end 24 can have ten flutes 28 evenly spaced. A head 30 such as a tool head for applying torque is mounted to the distal end 22 of the body 20. A suitable torque signaling mechanism 26, such as that disclosed in U.S. Pat. No. 5,503,042, for example, is housed within the body 20. The torque signaling mechanism 26 can indicate or signal when the head 30 is subjected to a torque that matches a predetermined torque setting. For adjusting the predetermined torque setting, a handle 40 is rotatably mounted to the proximal end of the body 20. The handle 40 is operably linked to the torque signaling mechanism 26 so that rotation of the handle 40 results in an increase or decrease of the predetermined torque setting, depending on whether the handle 40 is rotated clockwise or counterclockwise, respectively, in relation to the body 20. A locking sleeve 50 is mounted to the handle 40. The locking sleeve 50 can be mounted for slidable movement relative to the handle 40, along a direction parallel to the axis A. The locking sleeve 50 is movable along the direction parallel to the axis A between a locked position and an unlocked position and can be retained in the locked position or the unlocked position. FIG. 1 shows the locking sleeve 50 in the unlocked position.

FIG. 2 is a perspective view of the handle 40 of the torque wrench 10, and a fragmentary perspective view of the proximal end 24 of the body 20. The handle 40 can be mounted to the body 20. The tubular body 20 includes in its exterior surface at least one detent, such as a flute 28 positioned along a direction parallel to the axis A. The detent can be a groove, recess, or the like, extending along a direction parallel to the axis A.

According to an aspect of the invention, the locking sleeve is mounted for slidable movement along a direction parallel to the axis A relative to a cylindrical portion of the handle. The locking sleeve is movable between a locked position and an unlocked position. The cylindrical portion of the handle has a bore, and includes a locking ball residing in the bore. The locking sleeve includes a generally cylindrical rigid member and an elastomeric member. The rigid member has an interior annular wall and an interior annular recess, the elastomeric member seated adjacent the annular recess. When the locking sleeve is in the locked position, the annular wall of the locking sleeve is positioned to retain the locking ball radially inwardly to seat in the at least one flute of the body so that the handle is prevented from rotating. When the locking sleeve is in the unlocked position, the annular wall of the locking sleeve is positioned generally free from the locking ball so that the locking ball contacts the elastomeric member of the locking sleeve, the elastomeric member biasing the locking ball radially inwardly and being deflectable to permit radial movement of the locking ball to unseat from the at least one flute when the handle is rotated relative to the body.

As FIG. 3 illustrates in greater detail, the rotatable handle 40 includes a locking ball 60. The rotatable handle 40 includes a cylindrical portion 42 having at least one bore 44. The bore 44 can have a radial orientation, and is generally circular. A locking ball 60 resides movably in the bore 44 of the handle 40. The locking ball 60 can be, for example, a steel ball bearing. The handle 40 can have multiple radial bores 44 positioned on its cylindrical portion 42, the axial position of the multiple bores 44 being the same with respect to the axis A, and the multiple bores 44 being generally evenly spaced on the circumference of the cylindrical portion 42. Multiple locking balls 60 can be positioned in the multiple bores 44, one locking ball 60 being positioned in each bore 44, respectively. For example, as shown in FIGS. 3–8, the cylindrical portion 42 of the handle 40 can have two bores 44 and two locking balls 60, one locking ball 60 positioned in each bore 44. The two radial bores 44 are spaced preferably about 180° apart on the cylindrical portion 42 of the handle 40.

In order to retain the handle 40 in the locked position, as shown in FIG. 3, the locking sleeve 50 is slidably moved along axis A toward the distal end 22. The locking sleeve 50 is mounted to the cylindrical portion 42 of the handle 40. The locking sleeve 50 has a generally cylindrical rigid member 52 and an elastomeric member. The elastomeric member can be concentric, for example, an O-ring 58. The generally cylindrical rigid member 52 can have multiple generally concentric interior surfaces. For example, the generally cylindrical rigid member 52 can have an annular wall 54 (a first interior surface) and an annular recess 56 (a second interior surface) adjacent to the annular wall 54. The annular recess 56 can include an annular groove, and the like. The annular wall 54 can be positioned radially inwardly relative to the annular recess 56. In FIG. 3, the locking sleeve 50 has been moved to the locked position. In the locked position, the annular wall 54 is positioned to retain the locking balls 60 radially inwardly to simultaneously seat the locking balls 60 in the flutes 28 in the proximal end 24 of the body 20, so that the handle 40 is prevented from rotating.

In order to retain the handle 40 in the unlocked position, as FIG. 4 illustrates in greater detail, the locking sleeve 50 is slidably moved along axis A toward the proximal end 24. In FIG. 4, the locking sleeve 50 has been moved to the unlocked position. In the unlocked position, the annular wall 54 is positioned generally free from the locking balls 60 so that the locking balls 60 contact the O-ring 58, while the O-ring 58 biases the locking balls 60 radially inwardly to simultaneously seat in the flutes 28 in the proximal end 24 of the body 20. The locking balls 60 slightly deflect the O-ring 58 radially outwardly on contact, and the O-ring 58 biases the locking sleeve 50 toward the unlocked position.

Figure 5:
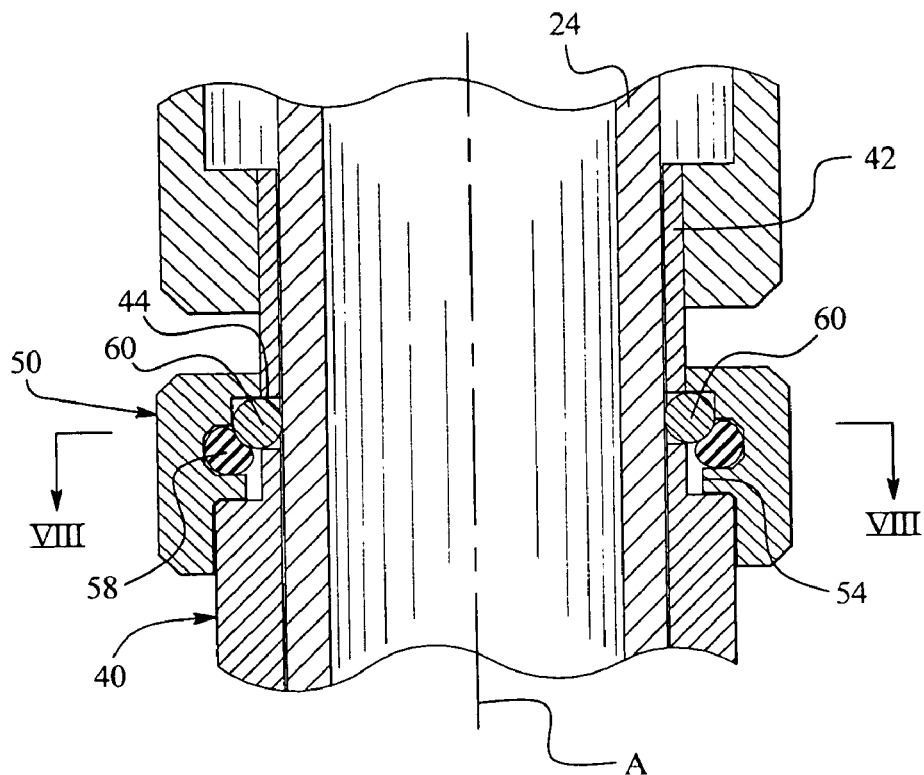
FIG. 5 is a sectional view taken generally along line V—V of FIG. 8, illustrating the locking sleeve in an unlocked position, wherein the locking balls deflect the O-ring when the locking sleeve has been rotated from the position illustrated in FIG. 4.

In order to adjust the torque setting, the handle 40 is rotated while in the unlocked position, as FIG. 5 illustrates in greater detail. In the unlocked position, rotation of the handle 40 relative to the body 20 permits radial outward movement of the locking balls 60 such that the locking balls 60 simultaneously unseat from the flutes 28 in the proximal end 24 of the body 20. The locking balls 60 deflect the O-ring 58 radially outwardly to a greater extent when the locking balls 60 are in the unseated position compared to the seated position of FIG. 4. Further rotation of the handle 40 permits radial inward movement of the locking balls 60 such that the locking balls seat in the flutes 28 again as in FIG. 4. The handle 40 can be rotated in either a clockwise or counterclockwise direction relative to the tubular body 20 for the purpose of adjusting the torque setting when the locking sleeve 50 is in the unlocked position.

Figure 6:
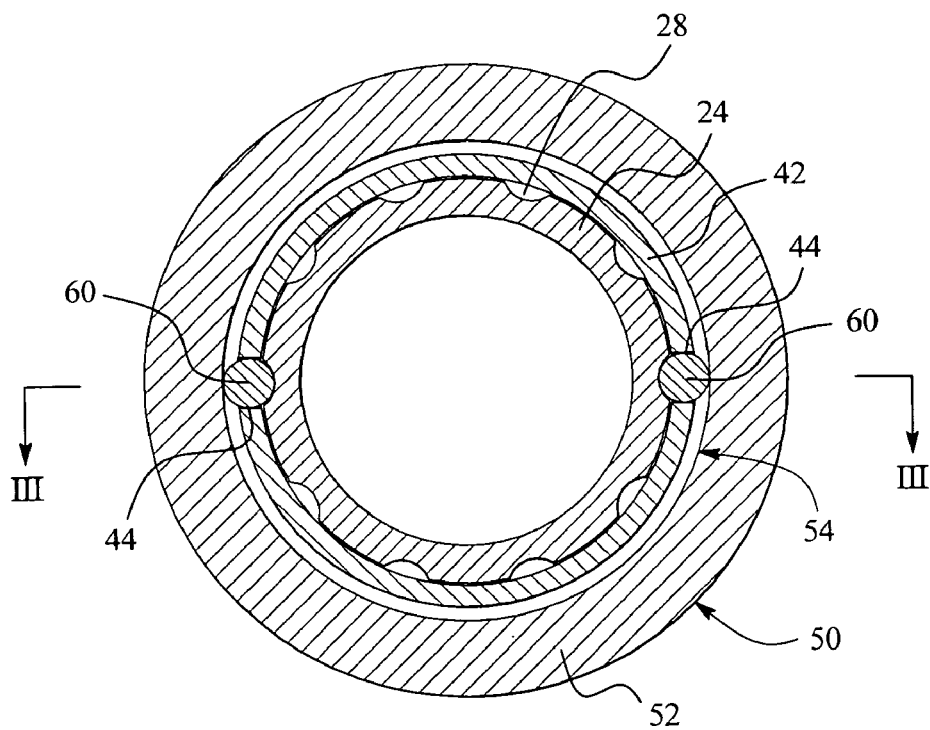
FIG. 6 is a sectional view taken generally along line VI—VI of FIG. 3, illustrating the locking sleeve in a locked position, in which the locking balls are retained in the detents by the locking sleeve.

In FIG. 6, which is a sectional view perpendicular to FIG. 3, the locking sleeve 50 has been moved to the locked position. In the locked position, the annular wall 54 is positioned to retain the locking balls 60 radially inwardly to simultaneously seat the locking balls 60 in the flutes 28 in the proximal end 24 of the body 20, so that the cylindrical portion 42 of the handle 40 is prevented from rotating.

Figure 7:
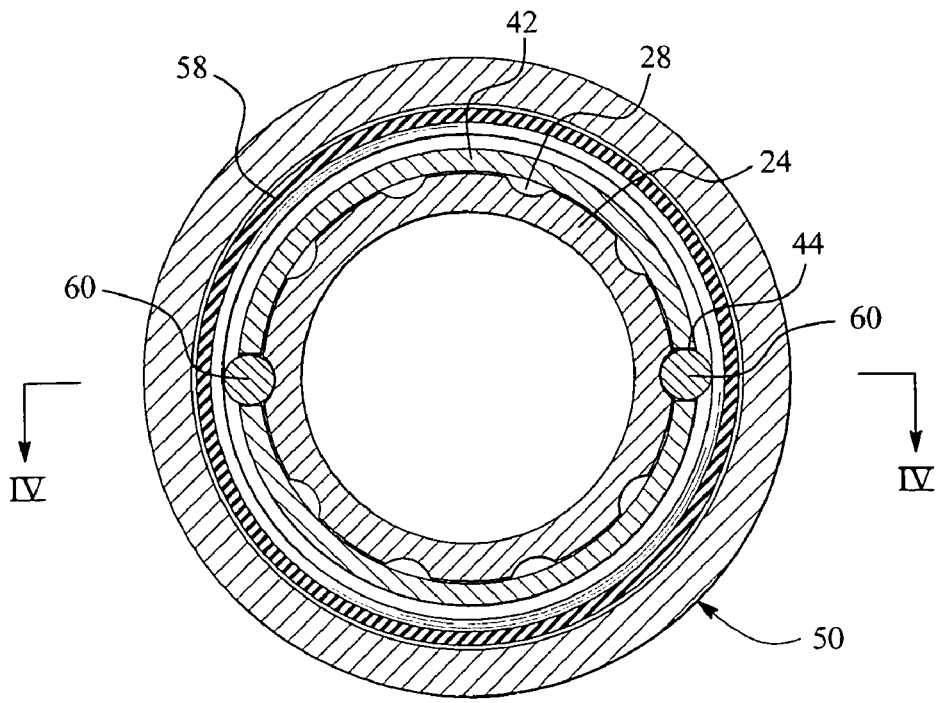
FIG. 7 is a sectional view taken generally along line VII—VII of FIG. 4, illustrating the locking sleeve in an unlocked position, in which the locking balls are free from the annular wall.

In FIG. 7, which is a sectional view perpendicular to FIG. 4, the locking sleeve 50 has been moved to the unlocked position. In the unlocked position, the locking balls 60 contact the O-ring 58, while the O-ring 58 biases the locking balls 60 radially inwardly to simultaneously seat in the flutes 28 in the proximal end 24 of the body 20. The locking balls 60 slightly deflect the O-ring 58 radially outwardly on contact, and the O-ring 58 biases the locking sleeve 50 toward the unlocked position. The cylindrical portion 42 of the handle 40 is now able to rotate relative to the proximal end 24 of the body 20.

Figure 8:
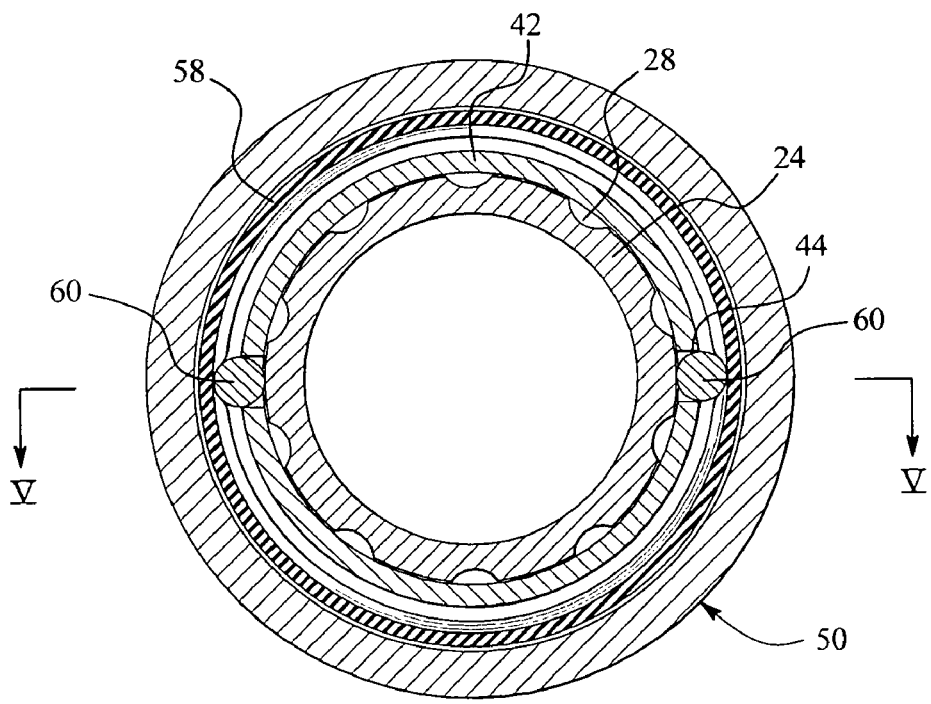
FIG. 8 is a sectional view taken generally along line VIII—VIII of FIG. 5, illustrating the locking sleeve in an unlocked position, in which the locking balls deflect the O-ring when the locking sleeve has been rotated from the position illustrated in FIG. 7.

In FIG. 8, which is a sectional view perpendicular to FIG. 5, the locking sleeve 50 has been moved to the unlocked position. In the unlocked position, rotation of the cylindrical portion 42 of the handle 40 relative to the proximal end 24 of the body 20 permits radial outward movement of the locking balls 60 such that the locking balls 60 simultaneously unseat from the flutes 28 in the proximal end 24 of the body 20. The locking balls 60 deflect the O-ring 58 radially outwardly to a greater extent when the locking balls 60 are in the unseated position compared to the seated position of FIG. 7. Further rotation of the handle 40 permits radial inward movement of the locking balls 60 such that the locking balls seat in the flutes 28 again as in FIG. 7. The handle 40 can be rotated in either a clockwise or counterclockwise direction relative to the tubular body 20 for the purpose of adjusting the torque setting when the locking sleeve 50 is in the unlocked position.

O-ring compositions useful in the present invention include fluorinated elastomers such as fluorocarbon elastomers, and the like. One suitable O-ring is VITON®, 75 Durometer, available from Tech-Syn Corp. (Bloomingdale, Ill.).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention. Moreover, any combination of the above-described elements in all possible variations thereof is encompassed by the invention unless otherwise indicated herein.

What is claimed is:

1. A torque wrench comprising:
   an elongate, tubular body that extends generally along an axis, the body having opposite proximal and distal ends, the proximal end of the body including at least one flute positioned along a direction parallel to the axis in an exterior surface thereof;
   a head mounted to the distal end of the body, the head adapted for applying torque;
   a torque signaling mechanism housed within the body for signaling when the head is subjected to torque that matches a predetermined torque setting;
   a handle that is rotatably mounted to the proximal end of the body, the handle being operably linked to the torque signaling mechanism so that rotation of the handle results in adjustment of the predetermined torque setting, the handle having a cylindrical portion with at least one radial bore;
   a locking sleeve mounted for slidable movement along a direction parallel to the axis relative to the cylindrical portion of the handle, the locking sleeve including a rigid member and an elastomeric member, the rigid member being generally cylindrical having at least a first interior surface and a second interior surface, the first and second surfaces being spaced from each other axially, the first interior surface being positioned radially inwardly relative to the second interior surface, the elastomeric member seated adjacent the second interior surface;
   at least one locking ball positioned in the bore of the handle; and
   wherein the locking sleeve is movable along the direction parallel to the axis between a locked position in which the first interior surface retains the locking ball radially inwardly to seat in the at least one flute so that the handle is prevented from rotating, and an unlocked position in which the first interior surface is generally free from the locking ball, and in which the locking ball contacts the elastomeric member, the elastomeric member biasing the locking ball radially inwardly and being deflectable to permit radial movement of the locking ball to unseat from the at least one flute when the handle is rotated relative to the body.

2. The torque wrench of claim 1, wherein the first interior surface is concentric.

3. The torque wrench of claim 1, wherein the second interior surface is concentric.

4. The torque wrench of claim 3, wherein the elastomeric member is concentric.

5. The torque wrench of claim 3, wherein the concentric second interior surface is a generally annular groove.

6. The torque wrench of claim 5, wherein the elastomeric member is an O-ring.

7. The torque wrench of claim 1, wherein the proximal end of the body has at least two flutes positioned along a direction parallel to the axis, wherein the cylindrical portion of the handle has at least two radial bores, and having at least two locking balls, one locking ball positioned in each bore.

8. The torque wrench of claim 7, wherein the at least two radial bores are spaced about 180° apart on the cylindrical portion of the handle.

9. The torque wrench of claim 8, wherein the at least two locking balls simultaneously seat in the at least two axially oriented flutes when the locking sleeve is moved into the locked position, and wherein the at least two locking balls contact the elastomeric member when the locking sleeve is moved into the unlocked position.

10. The torque wrench of claim 9, wherein the first interior surface is concentric, and wherein the second interior surface is a concentric generally annular groove.

11. The torque wrench of claim 10, wherein the elastomeric member is an O-ring.

12. The torque wrench of claim 11, wherein the O-ring biases the locking sleeve toward the unlocked position.

13. The torque wrench of claim 12, wherein the proximal end of the body has ten flutes positioned along a direction parallel to the axis, and wherein the ten flutes are evenly spaced.

14. The torque wrench of claim 1, wherein the proximal end of the body has ten flutes positioned along a direction parallel to the axis, and wherein the ten flutes are evenly spaced.

15. The torque wrench of claim 1, wherein the elastomeric member biases the locking sleeve toward the unlocked position.

16. A tool, comprising:
a tubular body that extends generally along an axis, the body including at least one detent positioned along a direction parallel to the axis in an exterior surface thereof;
a handle that is rotatably mounted to the body, the handle being operably linked to an adjustable signaling mechanism, the handle having at least one radial bore;
a locking sleeve mounted to the handle for slidable movement along a direction parallel to the axis relative to the handle, the locking sleeve including a rigid member and an elastomeric member, the rigid member being generally cylindrical having in an interior surface an annular wall and an annular recess adjacent the annular wall, the annular wall being positioned radially inwardly relative to the annular recess, the elastomeric member seated adjacent the annular recess;
at least one locking ball positioned in the bore of the handle; and
wherein the locking sleeve is movable along the direction parallel to the axis between a locked position and an unlocked position, such that when the locking sleeve is in the locked position, the annular wall is positioned to retain the locking ball radially inwardly to seat in the at least one detent of the body so that the handle is prevented from rotating, and when the locking sleeve is in the unlocked position, the annular wall is positioned generally free from the locking ball so that the locking ball contacts the elastomeric member, the elastomeric member biasing the locking ball radially inwardly and being deflectable to permit radial movement of the locking ball to unseat from the at least one detent when the handle is rotated relative to the body.

17. The tool of claim 16, wherein the elastomeric member is concentric.

18. The tool of claim 16, wherein the elastomeric member is an O-ring.

19. The tool of claim 16, wherein the body has at least two detents positioned along a direction parallel to the axis, wherein the handle has at least two radial bores, and having at least two locking balls, one locking ball positioned in each bore.

20. The tool of claim 19, wherein the at least two radial bores are spaced about 180° apart on the handle.

21. The tool of claim 20, wherein the at least two locking balls simultaneously seat in the at least two axially oriented detents when the locking sleeve is moved into the locked position, and wherein the at least two locking balls contact the elastomeric member when the locking sleeve is moved into the unlocked position.

22. The tool of claim 21, wherein the elastomeric member is an O-ring.

23. The tool of claim 22, wherein the O-ring biases the locking sleeve toward the unlocked position.

24. The tool of claim 23, wherein the body has ten detents positioned along a direction parallel to the axis, and wherein the ten detents are evenly spaced.

* * * * *